Figure 1:
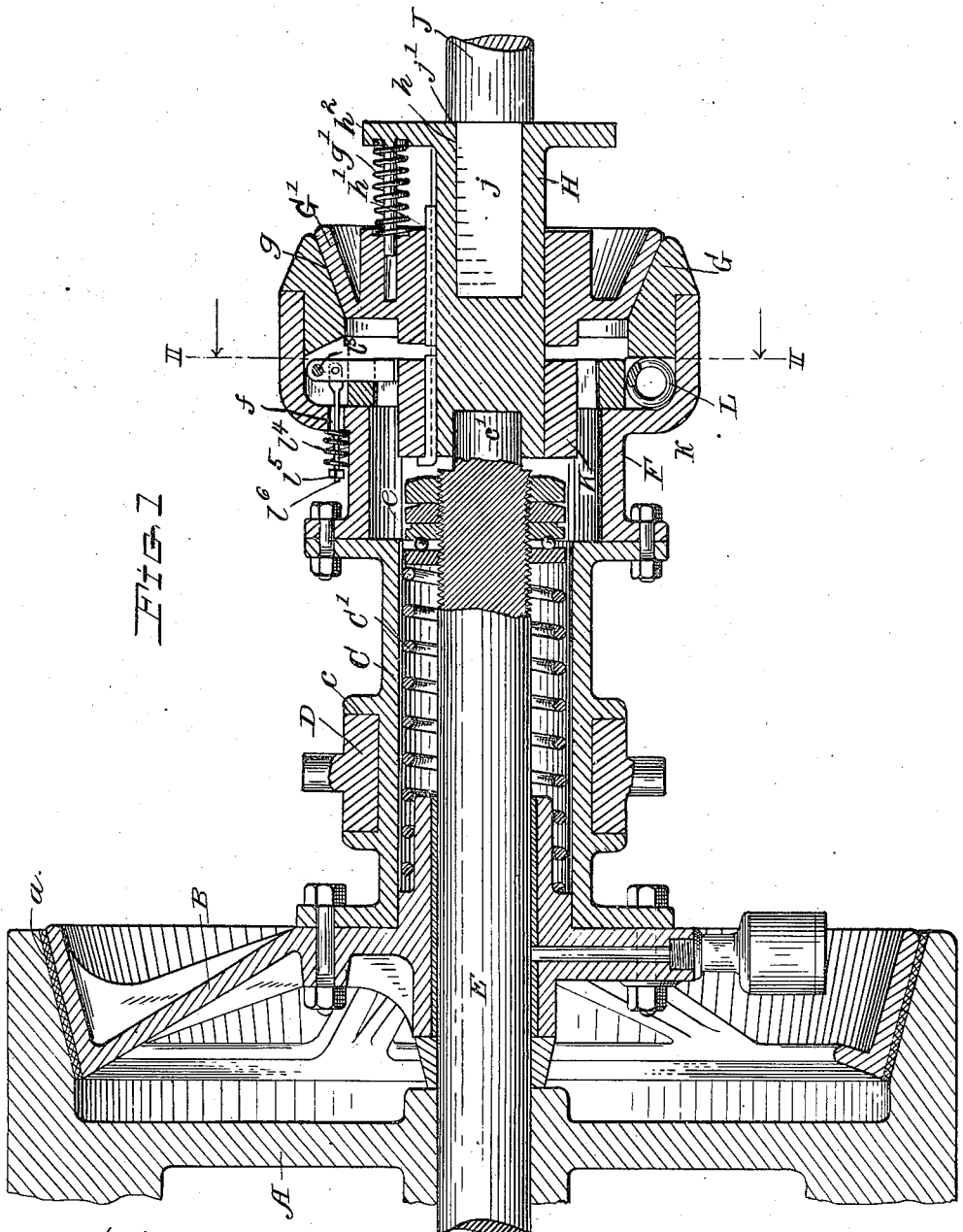

C. R. MINOR.
TRANSMISSION MECHANISM.
APPLICATION FILED OCT. 4, 1910.

1,006,867.

Patented Oct. 24, 1911.

2 SHEETS—SHEET 1.

Witnesses.
J. C. Turner
Winifred Waltz

Inventor,
Clarence R. Minor,
by A. C. Merkel,
his Attorney.

C. R. MINOR.
TRANSMISSION MECHANISM.
APPLICATION FILED OCT. 4, 1910.
1,006,867.
Patented Oct. 24, 1911.
2 SHEETS—SHEET 2.
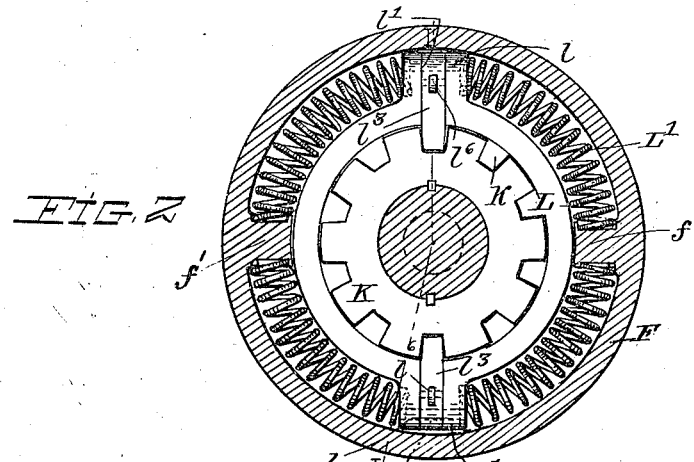
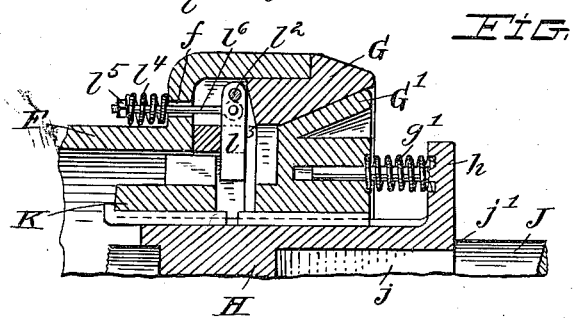
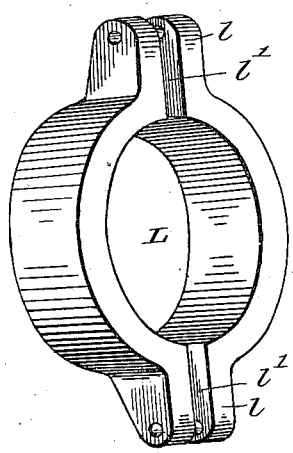
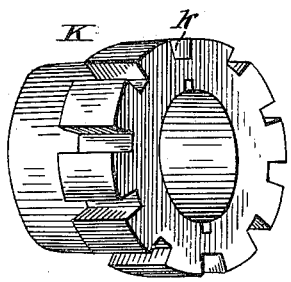
Witnesses.
J. C. Turner
Winifred Waltz
Inventor:
Clarence R. Minor,
by A. E. Merkel,
his Attorney.

UNITED STATES PATENT OFFICE.

CLARENCE R. MINOR, OF SANDUSKY, OHIO, ASSIGNOR OF ONE-FIFTH TO ARTHUR E. MERKEL, OF CLEVELAND, OHIO, AND TWO-FIFTHS TO EDWARD N. HAWLEY, OF NORWALK, OHIO.

TRANSMISSION MECHANISM.

1,006,867.  Specification of Letters Patent.  Patented Oct. 24, 1911.

Application filed October 4, 1910. Serial No. 585,221.

*To all whom it may concern:*

Be it known that I, CLARENCE R. MINOR, a citizen of the United States, resident of Sandusky, county of Erie, and State of Ohio, have invented a new and useful Improvement in Transmission Mechanism, of which the following is a specification, the principle of the invention being herein explained and the best mode in which I have contemplated applying that principle, so as to distinguish it from other inventions.

My invention relates to transmission mechanism, and particularly to transmission mechanism adapted to connect an automobile engine with the main driving shaft of the automobile.

The object of the invention is to eliminate the shock to the parts of the automobile incident to the change of relative speeds between the engine shaft and main driving shaft and parts connected thereto, when the change gears are operated to alter the speed relation of the parts.

The said invention consists of means which are hereinafter fully described and particularly set forth in the claims.

The annexed drawings and the following description set forth in detail certain mechanism embodying my invention, the disclosed means, however, constituting but one of various mechanical forms in which the principle of the invention may be employed.

In said annexed drawings:—Figure 1 is an axial section of a device embodying my invention, as applied to an automobile, the interior ends of the crank shaft and the main driving shaft being shown in their positions relative thereto. Fig. 2 is a section taken upon the plane indicated by line II—II of Fig. 1. Fig. 3 is a fragmentary axial section illustrating a change of relationship of the parts. Figs. 4 and 5 are perspective details of portions of the mechanism.

As illustrated in Fig. 1, A represents an ordinary fly wheel provided with the female friction clutch surface $a$ in the usual manner. This fly wheel as is usual, is keyed to the crank shaft, and mounted upon the latter so as to be slidable and rotatable thereon, is a complementary main male clutch member B, of the usual type. The usual sleeve C is secured to the latter, which is provided with the annular groove $c$ for receiving the shifting yoke D, as will be readily understood. The interior end of the crank shaft E is threaded, and mounted upon such portion is a thrust bearing $e$ of the usual construction. Interposed between the clutch member B and the bearing $e$ is an ordinary helical spring C' which serves to maintain the frictional engagement between the fly wheel and member B, or tends to do so. The yoke D is operated by the foot pedal, in the usual manner, so that the main clutch member A or fly wheel, and the complementary clutch member B may be engaged or disengaged at will. Bolted to the rear face of the sleeve C is a rearwardly extending housing F, which therefore forms a part of the clutch member B. The rear end of this housing is provided with an auxiliary female clutch member G, provided with a conical friction surface $g$. The one end of the crank shaft E is reduced as at $c'$, and this reduced portion forms the forward journal for the driven member H. The other end of this member H is provided with a bore $h$ of square cross-section which receives the forward end $j$ of the main driving shaft J, which is also squared for insertion into the bore $h$. A shoulder $j'$ is formed, against which the rear end of the driven member H abuts, so as to hold said driven member against longitudinal displacement.

Rotatably secured by means of a spline $h'$ and longitudinally slidable upon the member H, is a male auxiliary and complementary friction clutch member G'. The rear end of member H is provided with a flange $h^2$, and interposed between the latter and the auxiliary clutch member G' are a series of suitably mounted springs $g'$. These springs maintain frictional engagement between members G and G'.

Fixedly secured to the forward end of the member H so as to be rotatable therewith and fixed in the direction of its axis, is a member K provided with peripheral slots $k$, illustrated in detail in Fig. 5. The diameter of this latter member is such that the forward end of the housing member F may slide over it, as shown in Fig. 3. Interposed between the housing member F and the slotted member K, is a ring L, illustrated in Fig. 4. This ring is provided with two diametrically opposite lugs $l$, which are provided with slots $l'$. Transversely of the outer end of these slots are pivot pins $l^2$, which carry dogs $l^3$ which are therefore oscillatory in a plane containing the axis of the driven member. These dogs are actuated by springs $l^4$ respectively, which are respectively interposed between the outer surface of the housing F and nuts $l^5$ secured to the outer ends of stems $l^6$, which are pivotally secured to the dogs $l^3$ and extend through suitable openings $f$ formed in the housing, as shown in Figs. 1 and 3. The housing F is furthermore provided with two diametrically oppositely located lugs $f'$ $f'$, Fig. 2, and interposed between the lugs $l$ and $f'$ are the coil springs L'. The interior diameter of the housing adjacent to the ring is made sufficient to cause the latter to embrace the lugs $l$, so that it will be seen that the ring may yield in the direction of rotation, the amount of such yielding being limited by the strength of the springs L'.

The above described device operates as follows:—When the clutch members A and B are in engagement with each other, the dogs $l^3$ are in engagement with the slots $k$ formed in the member K, and positive connection is therefore established between the clutch member B and the driven member H, such connection being maintained throughout the rotation of the parts during such engagement of members A and B. Assuming now that it is desired to change the speed of the vehicle, the clutch member B is thrown out in the usual manner by means of the foot pedal. This action necessarily causes the said member B to move rearwardly, and such movement effects also the movement of the connected parts, including housing F, in such rearward direction. The dogs $l^3$ in consequence disengage the slotted member K, and the parts assume the position shown in Fig. 3, the auxiliary clutch members G and G' maintaining their frictional engagement as before, as a result of the action of the springs $g'$, as before described. This having been accomplished, the lever for changing the speed relationship of the speed changing mechanism of the automobile is now operated to impart to such mechanism the desired change, whereby the speed of the main driving shaft J is immediately changed. At this time, however, it will be noted that there is no positive connection between the clutch member B and its connected parts and said driving shaft, the only connection which is established at this time being that effected by the frictionally engaged members G and G'. The sudden change of speed relationship therefore between the clutch member B and connected parts and the shaft J is communicated through the medium of these engaging clutch members, but such engagement being frictional and not positive, the two members at the first instant slip slightly and continue to move relatively to each other until the new speed of rotation is communicated to the clutch member B and connected parts. A gradual, though very quick, change of speed on the part of the member B and connected parts, is thereby effected, and the shock ordinarily incidental to such change of speed is thereby eliminated. The speeds of the shaft J and the clutch member B now having become equal, the foot pedal is released and the parts re-assume the relationship illustrated in Fig. 1, the dogs $l^3$ engaging the slots of the member K. In this re-assumption of the said position, should the dogs $l$ not immediately register with slots, they yield as a result of the construction previously described, including the springs $l^4$, until such registration is effected, when the said springs cause them to enter two slots respectively. It will now be noted that the positive connection between the driving member B and the driven member J is reëstablished. This positive connection, however, instead of being rigid, is yielding, as the result of the interposition of the springs L' between the ring L, which is now rigidly connected with the driven member H, and the lug $f$ of the housing F, the latter being, as will be noted, rigidly connected with the driving member B. These springs, therefore, act as a shock absorber, which becomes effective in such instances where the operator effects the change of the speed changing gears very quickly, and does not give the clutch member G' sufficient time to impart its full speed of rotation to the clutch member G, and hence to the driving member B.

The complementary clutch is purposely made of smaller diameter than the main driving clutch, thus reducing the effective lever arm and permitting the two members of the complementary clutch to more readily slip upon each other when the occasion requires.

Having fully described my invention, what I claim and desire to secure by Letters Patent is:—

1. In transmission mechanism, the combination of a driving clutch including in its structure two members, one of which is adapted to be connected or disconnected from the other; means for effecting such connection or disconnection; a driven member frictionally connected with one of said clutch members; and means for establishing positive connection between such driven member and said connectible or disconnectible clutch member; the latter member being adapted when actuated to disengage the other clutch member, to render inoperative the means for establishing said above-named positive connection.

2. In transmission mechanism, the combination of a driving clutch including in its structure two members, one of which is shiftable so as to be capable of connection with or disconnection from the other; a driven member frictionally connected with said shiftable member; and disconnectible means carried by such shiftable member adapted to positively engage said driven member and arranged to be disengaged from the driven member when the said shiftable clutch member is caused to disengage the other clutch member.

3. In transmission mechanism, the combination of a driving clutch including in its structure two members, one of which is shiftable so as to be capable of connection with or disconnection from the other; a driven member in permanent frictional engagement with said shiftable member; and disconnectible means carried by such shiftable member adapted to positively engage said driven member and arranged to be disengaged from the driven member when the said shiftable clutch member is caused to disengage the other clutch member.

4. In transmission mechanism, the combination of a driving clutch including in its structure two members, one of which is shiftable so as to be capable of connection with or disconnection from the other; a driven member in permanent yielding frictional engagement with said shiftable member; and disconnectible means carried by such shiftable member adapted to positively engage said driven member and arranged to be disengaged from the driven member when the said shiftable clutch member is caused to disengage the other clutch member.

5. In transmission mechanism, the combination of a driving member; a driven member; a clutch member adapted to be connected and disconnected from said driving member; an auxiliary clutch member connected with said first named clutch member; a complementary clutch member for yieldingly engaging said auxiliary clutch member, and connected with said driven member; means for maintaining such yielding engagement between said auxiliary and complementary clutch members; and means for establishing and disestablishing positive engagement between said first named clutch member and said driven member.

6. In transmission mechanism, the combination of a driving member; a driven member; a shiftable clutch member for engaging and disengaging said driving member; an auxiliary clutch member carried by said first named clutch member; a complementary clutch member for yieldingly engaging said auxiliary clutch member, and rotatably secured to said driven member; means for maintaining such yielding engagement between said auxiliary and complementary clutch members; a circumferentially slotted member rotatably fixed with respect to the driven member, and movable relatively to said first-named clutch member; and means carried by said first named clutch member for engaging or disengaging said slotted member when said first named clutch member is shifted.

7. In transmission mechanism, the combination of a driving member; a main clutch member mounted co-axially with said driving member, and shiftable into and out of engagement with the latter; a driven member; a circumferentially slotted member fixedly secured to said driven member; a member adapted to yield in the direction of rotation and carried by said clutch member; means mounted on said latter member adapted to engage or disengage said slotted member when said clutch member is shifted; and springs interposed between said yielding member and clutch member.

8. In transmission mechanism, the combination of a driving shaft; a main clutch member mounted thereon and fixed thereto; a complementary main clutch member rotatably mounted upon said shaft, and shiftable in the direction of its axis; a rotatable driven member co-axial with said shaft and fixed in the direction of the axis of the latter; a circumferentially slotted member fixed to said driven member; an auxiliary clutch member fixed to said shiftable main clutch member; a complementary auxiliary clutch member mounted on said driven member, rotatably fixed thereto, but slidable thereon in the direction of its axis; springs interposed between said driven member and said slidable auxiliary clutch member for maintaining frictional engagement between said auxiliary complementary member; and dogs carried by said slidable main clutch member engaging said slotted member, said dogs being so placed as to disengage said slotted member when said complementary main clutch member is shifted to disengage said first named main clutch member.

9. In transmission mechanism, the combination of a driving clutch including in its structure a shiftable member; a driven member; means for establishing and disestablishing positive connection between said shiftable member and said driven member; means for effecting the shifting movement of said clutch member, and adapted to actuate said means for disestablishing and establishing such positive connection; and a complementary driving clutch of smaller diameter than said first named driving clutch, one of the members of said complementary clutch being connected to said shiftable clutch member, and the other member of said complementary clutch being rotatably fixed to said driven member.

Signed by me, this 30th day of September, 1910.

CLARENCE R. MINOR.

Attested by—
 WINIFRED WALTZ,
 CURT B. MUELLER.